(12) United States Patent
Su

(10) Patent No.: US 8,275,760 B2
(45) Date of Patent: Sep. 25, 2012

(54) DYNAMIC HEADLINE SWITCHER

(75) Inventor: Yuan Lin Su, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 871 days.

(21) Appl. No.: 11/770,296

(22) Filed: Jun. 28, 2007

(65) Prior Publication Data

US 2009/0006325 A1    Jan. 1, 2009

(51) Int. Cl.
*G06F 17/30* (2006.01)
(52) U.S. Cl. .......................... 707/707; 715/764
(58) Field of Classification Search .............. None
See application file for complete search history.

(56) References Cited

U.S. PATENT DOCUMENTS

| | | | |
|---|---|---|---|
| 6,182,098 B1* | 1/2001 | Selker | 715/202 |
| 6,327,628 B1* | 12/2001 | Anuff et al. | 719/311 |
| 6,684,217 B1* | 1/2004 | Schneider | 707/102 |
| 6,789,201 B2* | 9/2004 | Barton et al. | 726/24 |
| 7,047,033 B2 | 5/2006 | Wyler | |
| 7,107,264 B2 | 9/2006 | Lu | |
| 7,499,940 B1* | 3/2009 | Gibbs | 707/102 |
| 2002/0056100 A1* | 5/2002 | Shimomura et al. | 725/39 |
| 2004/0216036 A1* | 10/2004 | Chu et al. | 715/501.1 |
| 2005/0097190 A1* | 5/2005 | Abdelhak | 709/217 |
| 2005/0114324 A1* | 5/2005 | Mayer | 707/3 |
| 2005/0138049 A1* | 6/2005 | Linden | 707/100 |
| 2005/0246321 A1* | 11/2005 | Mahadevan et al. | 707/3 |
| 2006/0184512 A1* | 8/2006 | Kohanim et al. | 707/3 |
| 2007/0112792 A1* | 5/2007 | Majumder | 707/100 |
| 2008/0040474 A1* | 2/2008 | Zuckerberg et al. | 709/224 |

OTHER PUBLICATIONS

Digg.com screenshot—retrieved from the web archive for Mar. 14, 2006. web.archive.org/web/20060314141216/www.digg.com Last visited on Jun. 17, 2009.*
Google Video screenshot—retrieved from the web archive for Feb. 2006 web.archive.org/web/20060221142652/video.google.com Last visited on Jun. 17, 2009.*
Webshots screenshot—retrieved from the web archive for Mar. 2006 web.archive.org/web/20060312040641/www.webshots.com Last visited on Jun. 17, 2009.*
Yahoo News—retrieved from the web archive for Aug. 2005. web.archive.org/web/20050831205249/news.yahoo.com Last visited on Jun. 17, 2009.*

* cited by examiner

*Primary Examiner* — Neveen Abel Jalil
*Assistant Examiner* — Daniel Kinsaul
(74) *Attorney, Agent, or Firm* — Brinks Hofer Gilson & Lione

(57) ABSTRACT

A system for dynamic headline switching. The system includes a database, a display module, an interface module, and a search engine. The database contains entry data for accessing content such as stories, pictures, or videos. The display engine generates a display including a current headline. The interface module indexes through each headline, for example, at a predetermined time interval, to provide new and updated information to the user. The search engine queries the database and generates a list of entries allowing the user to access content related to the current headline.

11 Claims, 2 Drawing Sheets

DYNAMIC HEADLINE SWITCHER

BACKGROUND

1. Field of the Invention

The present invention generally relates to a system for dynamic headline switching.

2. Description of Related Art

The space available on a web page is very limited in comparison to the possible content available which may be displayed in that space. Therefore, compares are often looking for ways to increase the usability of content, features, and applications while minimizing the amount of real estate used. This is particularly true when relevant content may be pulled from multiple related properties or the Internet in general. Problems may occur when various groups build interactive components, such as headline tickers, carousels and various modules to accommodate cross property promotion without addressing overall usability and business goals. Today, many related property sites contain highly interactive stores of content, however, the content may not necessarily be accessible based on contextual relevance to the users needs.

In view of the above, it is apparent that there exists a need for an improved system for dynamic headline switching.

SUMMARY

In satisfying the above need, as well as overcoming the drawbacks and other limitations of the related art, a system for dynamic headline switching is provided.

The system includes a database, a display module, an interface module, and a search engine. The database contains entry data for accessing content such as stories, pictures, or videos. The display engine generates a display including a current headline. The interface module indexes through each headline, for example, at a predetermined time interval, to provide new and updated information to the user. The search engine queries the database and generates a list of entries allowing the user to access content related to the current headline.

The list may include content, such as stories, videos, or pictures, from the current vertical property and/or content from other network properties through an aggregation module. In addition, the system may formulate a list that includes the most relevant content, the most popular content, or content based on other predefined criteria.

In addition, the system may provide the headline in an editable control allowing the user to click on the control and edit the headline. As the headline is being edited, the system may use predictive text techniques to provide a drop down list of key words. In addition, the list may be regenerated or updated based on the updated text in the headline. The editable headline may be positioned on a panel including a headline image corresponding to the headline, the list created from the database, and headline controls allowing the user to access the previous headline, the next headline, or pause the current headline.

Further objects, features and advantages of this invention will become readily apparent to persons skilled in the art after a review of the following description, with reference to the drawings and claims that are appended to and form a part of this specification.

DETAILED DESCRIPTION

Figure 1:
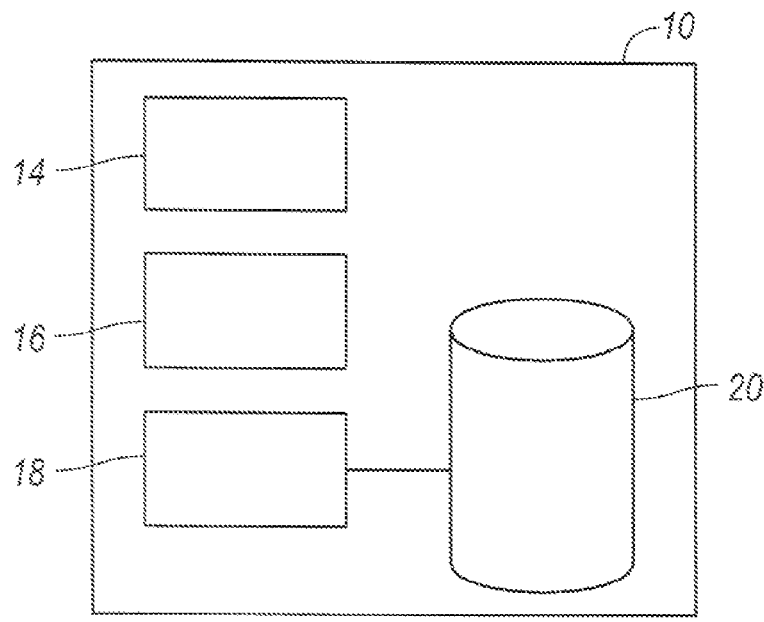
FIG. 1 is a schematic view of system for dynamic headline switching according to one embodiment.

Referring now to FIG. 1, a system 10 for generating a dynamic headline switcher is provided. The system 10 includes a display module 14, an interface module 16, a search engine 18, and a database 20. The display module 14 generates a web page including a headline. The headline may be selected by the interface module 16 from a number of possible headlines. The group of headlines may be related to current news stories or may be selected based on stored user preferences. The interface module 16 is configured to index through each headline in the group of headlines and update the current headline in the display module 14. The headlines may be indexed automatically based on a predetermined time period, such as every 30 seconds or determined by server-side settings. Alternatively, controls may be provided to allow the user to manipulate the indexing of the headlines. The system 10 generates a list of accessible content corresponding to the current headline. As such, the interface module 16 is in communication with the search engine 18 to provide the current headline and interrelated search criteria. The search engine 18 accesses the database 20 including entries corresponding to available content, such as stories, pictures, or video. The search, engine 18 may be configured to select content from the database 20 related to the most popular entries that match the search criteria. In addition, the search engine 18 may generate and store a list of content based on the most relevant content or a mixture of the most relevant and most popular content. The most popular content may be identified, for example, by the greatest number of hits, while the most relevant content may be identified, for example, by the best correlation to given search criteria.

Each of the elements of the system 10 may be embodied in a single or multiple connected servers, such that the functionality described may be embedded in electrical circuits or programmed to function on one or more microprocessors. In addition, the data manipulated by the elements may be stored in each element or communicated between elements through electronic signals. Further, one of ordinary skill in the art would appreciate that in light of the processes and architecture described herein, a variety of known search engine, interface or display implementations may be readily integrated into the system 10.

Figure 2:
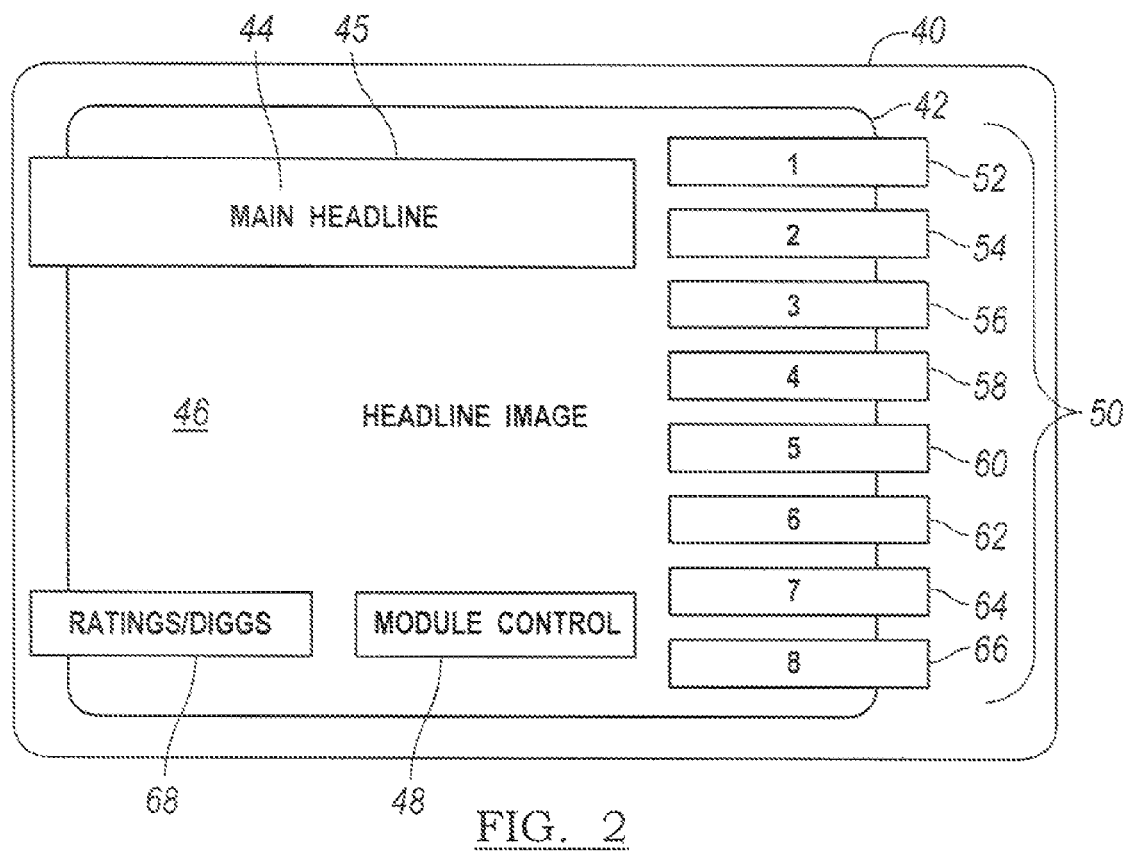
FIG. 2 is a graphical representation of a webpage for dynamic headline switching.

Now referring to FIG. 2, a graphical illustration of an exemplary web page 40 that may be generated by the display module 14 is provided. The web page 40 may include a panel 42 where a current headline 44 is displayed. The current headline 44 may be displayed in a dynamic headline field 45. The dynamic headline field 45 may be attached to a pull-down button, which is triggered by hovering over the field, e.g. a mouse roll over with a timed delay, such as a 1.5 second delay. A fly out window may appear below the dynamic headline field 45, thereby allowing the user to manually change the headline 44. The background for the panel 42 may include a headline image 46, which may be a picture or video corresponding to the current headline text. In one implementation, clicking on the headline 44 would allow the user to access the related content to the headline while the headline module control 48 would enable the user to scroll through editorialized content. A list 50 is shown along the right hand side of the panel 42. For the embodiment shown in FIG. 2, the list 50 includes eight entries, although the number of entries may be readily changed. As previously mentioned, the list 50 is generated by the search engine 18 based on the current headline 44. The list 50 may include entries that provide access to various content, for example, stories, images, or video relating to the headline 44. In addition, the entries may be selected according to the popularity of the content, relevance of the content, or both. The content may be simply ranked or sorted by another democratized method to order from most popular/relevant at the top of the list (item 52) to the least popular/relevant at the bottom of the list (items 66).

Alternatively, the list may be formed from a predetermined mix of content. As such, item 52 at the top of the list may be assigned to images showing the most popular content meeting the search criteria that correspond to the headline. Similarly, the second item 54 may be selected to access videos showing the most popular video content matching the search criteria related to the headline. The third item 56 may be selected to access the second most related story to the headline 44 within the host property. Item 58 may be selected to access the third most related story within the host property. Item 60 may be selected to access the most related story outside of the host property over the network to a property with the highest degree of relevance to the headline. Item 62 may be selected to access the most relevant story outside of the host property over the network. Item 64 may be selected to access the most related story, for example over the Internet. Meanwhile, item 66 may be selected to access an advertisement most relevant to the current headline 44. Accordingly, it can be seen that various strategies can be implemented to provide an appropriate mix of popular and relevant content, as well as, local and network content.

A module control 48 may be provided on the panel 42 allowing the user to control the indexing of the headline. In the default mode, the headline may be indexed according to a predetermined time period, for example, every 30 seconds. The headline control 48 may allow the user to pause the automated indexing of the headline 44, resume (play) the indexing from a paused mode, select the previous headline, or select the next headline in the sequence. The control 48 may also provide a drop down list showing each headline in the sequence allowing the user to select them directly. In addition, a rating module 68 may be provided on the panel 42 to provide user feedback as to the quality (ratings) of the content related to the current headline 44.

Figure 3:
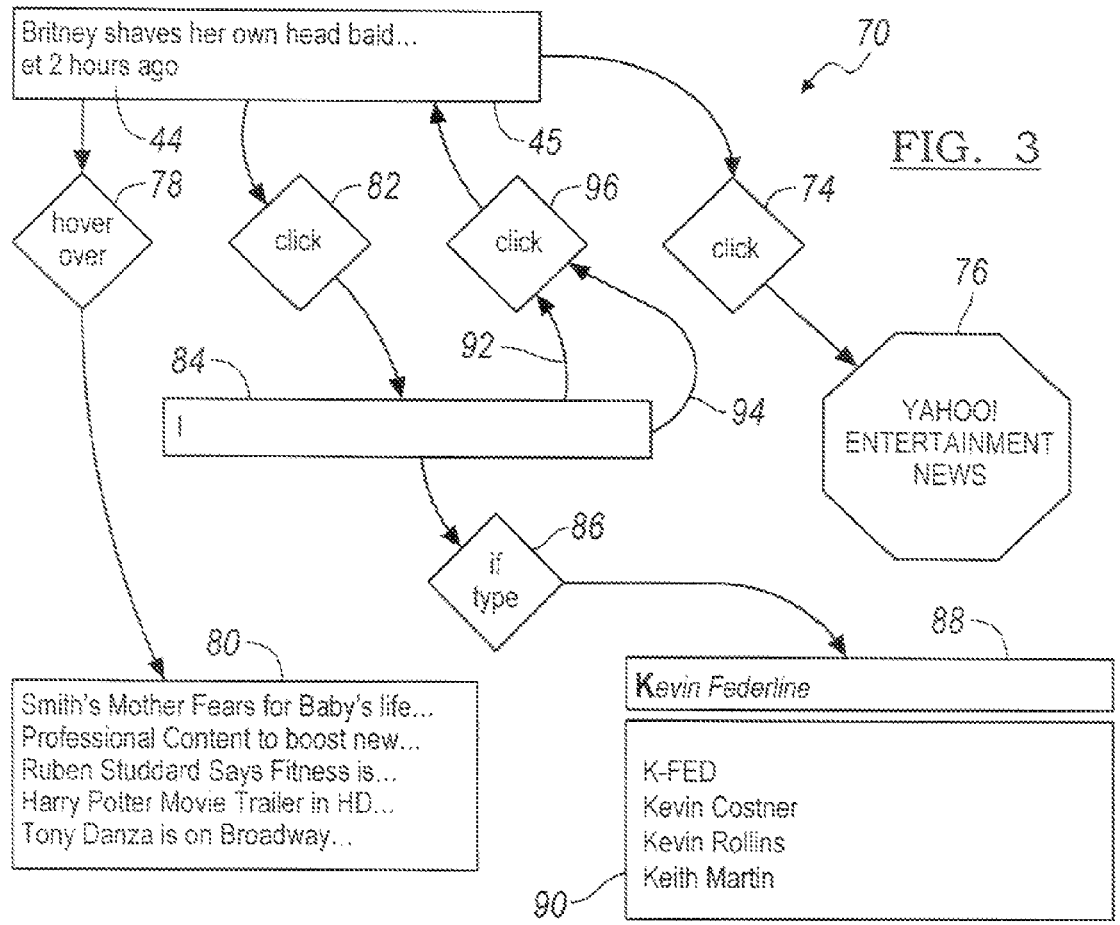
FIG. 3 is a flow diagram illustrating exemplary use of the dynamic headline field.

The editable nature of the headline may be better understood using the flow diagram 70 provided in FIG. 3. The current headline 44 is displayed in the dynamic headline field 45. The user may click on the current headline 44 as the denoted by block 74. The content (i.e., story) related to the headline 44 is displayed as denoted by block 76. If the user hovers the cursor over the dynamic headline field 45 as denoted by block 78, the pop-up window 80 is displayed giving a brief summary of the related content as denoted by block 80. The cursor may be required to hover for a predetermined time period, such as five seconds, and the pop-up window may fade into view as the cursor remains over the dynamic headline field 45.

If the user right clicks on the dynamic headline field 45 as denoted by block 82, the dynamic headline field 45 enters a text editable mode as denoted by block 84. A blinking cursor may be provided to prompt the user to enter the text and/or the text of the current headline 44 may be provided or selected for editing. If the user types text info the dynamic headline field 45 as denoted by block 86, the dynamic headline field 45 may enter a predictive text mode as denoted by block 88. The predictive text mode completes the user typed word based on popularity and other predictive text techniques. In addition, a drop down list 90 may be provided in a window to display a list of popular or predictive key words. The user may select from the list rather than completing the text, if the predicted entry does not match the user's intent. When a selection from the list is clicked or when the user finishes typing the key words and hits enter as denoted by line 92 and block 96, the current headline 44 is updated. As the current headline 44 is updated a new list is generated based on key words in the current headline 44. Similarly, if the user hits enter on a blank field as denoted by line 94 and block 96, the current headline 44 may revert to the previous headline, as it existed prior to editing.

Figure 4:
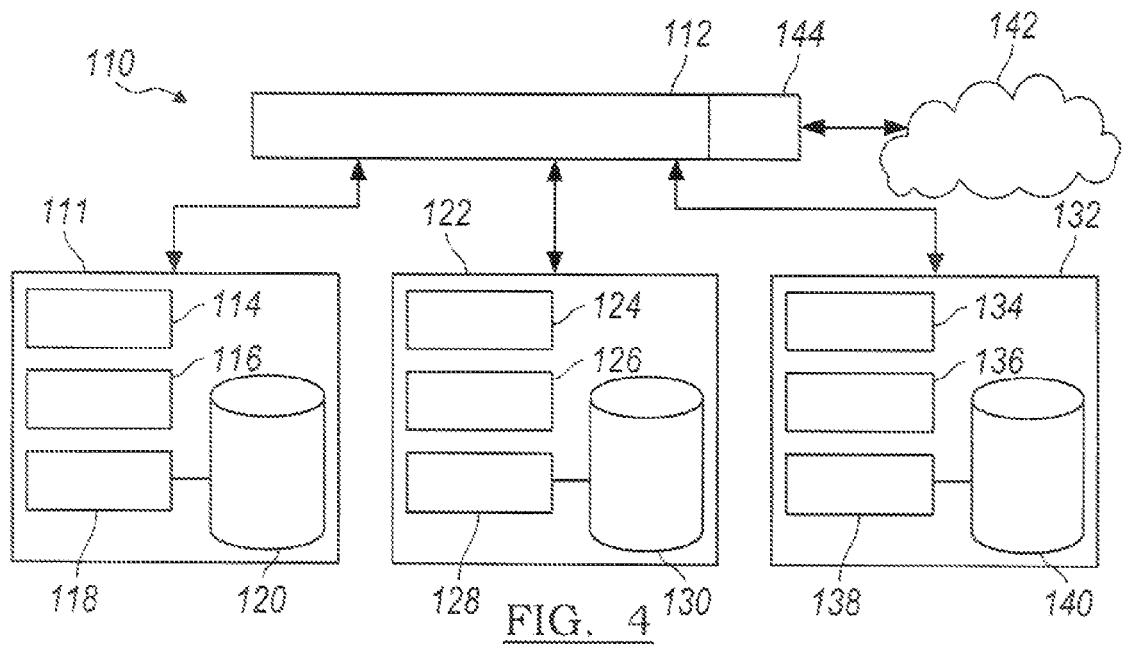
FIG. 4 is a schematic view of a system for dynamic headline switching across multiple vertical properties according to one embodiment.

Now referring to FIG. 4, a schematic view of a system for dynamic headline switching across multiple vertical properties is provided. The system 110 may include multiple vertical properties 111, 122, 132, ail of which may independently correspond to the system 10 in FIG. 1. Accordingly, vertical property 111 includes a display module 114, an interface module 116, and a search engine 118. The display 114 may generate a web page corresponding to web page 40 from FIG. 2. The search engine 118 may access the database 120 to update the list 50 of content corresponding to the current headline 44. The vertical property 111 may also be in communication with an aggregation module 112 to collect information from other vertical properties 122, 132 or over the Internet 142. The search engine 118 may generate key words from the headline and/or generate additional search criteria based on the headline 44. The key words and search criteria may be provided to the aggregation module 112 and distributed to other vertical properties 122, 132.

Vertical property 122 includes a display module 124, an interface module 126, a search engine 128, and a database 130. The search criteria may be provided to the search engine 128 for querying the database 130. The search engine 128 returns related search results including relevance and popularity to the aggregation module 112. Similarly, vertical property 132 includes a display module 134, an interface module 136, a search engine 138, and a database 140. The search engine 138 may receive the key words and search criteria from the aggregation module 112 to query the database 140. The search engine 138 generates search results from vertical property 132 by querying the database 140. The search results from vertical properties 122 and 132 may be provided to the aggregation module 112 including relevance and popularity information. Further, the aggregation module 112 may provide the key words and search criteria to a general web based search engine 144 to query the Internet 142. The web based search engine 144 may generate search results including relevance and popularity information to be provided to the aggregation module 112.

The aggregation module 112 may then combine the search results from vertical property 122, vertical property 132, and the Internet search engine 144 in a manner that provides a subset of the search results including, for example, the most popular and/or most relevant items. The search engine 118 may then generate a list 50 based on both the search results from database 120 and the most popular and/or relevant search results provided by the aggregation module 112. As such, the list 50 is generated including information from multiple vertical properties and the internet that corresponds to the current headline 44. The current headline 44 and the list 50 may be displayed and manipulated as described above in this application.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

I claim:

1. A system for switching a headline, the system comprising:
    a processor;
    a database containing entry data;
    a display engine configured to generate a display including a current headline of a plurality of headlines and a headline image;
    an interface module configured to automatically index through the each headline of the plurality of headlines to vary the current headline according to a predetermined time period, the interface module including a headline control allowing a user to pause the current headline from indexing, wherein the current headline may be manipulated to enter into a user editable text mode;
    a search engine configured to query the database and generate a list of entries based on the current headline;
    wherein the display engine is configured to display the list for navigation by a user; and
    an aggregation module in communication with a plurality of vertical properties, and wherein the database, the display module, the interface module and the search engine form a vertical property of the plurality of vertical properties, the aggregation module being configured to provide search criteria to at least one other vertical property of the plurality of vertical properties based on the current headline, and aggregate search results returned from the at least one other vertical property, the aggregation module being configured to provide aggregated search results to the search engine, and the search engine being configured to generate the list based on the aggregated search results.

2. The system according to claim 1, further comprising generating the search results when current headline is changed.

3. The system according to claim 1, wherein the list includes the most popular images that match given search criteria.

4. The system according to claim 1, wherein the list includes the most popular video that match given search criteria.

5. The system according to claim 1, wherein the list includes the most popular vertical property stories that match given search criteria.

6. The system according to claim 1, wherein the list includes the most popular network stories that match given search criteria.

7. The system according to claim 1, wherein the list includes the most relevant images.

8. The system according to claim 1, wherein the list includes the most relevant video.

9. The system according to claim 1, wherein the list includes the most relevant vertical property stories.

10. The system according to claim 1, wherein the list includes the most relevant network stories.

11. The system according to claim 1, wherein the interface module automatically indexes through the each headline of the plurality of headlines to vary the current headline according to a predetermined time period.

\* \* \* \* \*